Patented July 24, 1928.

1,678,150

UNITED STATES PATENT OFFICE.

JAMES W. LAWRIE, OF WILMINGTON, DELAWARE, ASSIGNOR TO E. I. DU PONT DE NEMOURS & COMPANY, OF WILMINGTON, DELAWARE, A CORPORATION OF DELAWARE.

PRODUCTION OF GLYCERINE BY FERMENTATION.

No Drawing. Application filed July 27, 1922. Serial No. 577,992.

This invention relates to the production of ethyl alcohol and glycerine by the fermentation of molasses, and pertains especially to a cylic process of fermentation which is substantially more efficient and less expensive than the glycerine fermentation processes heretofore known.

It has been shown through the work of Pasteur, Neuberg, Connstein, Lüedecke, Eoff and others that glycerine is produced in varying amounts by the direct fermentation of carbohydrates by yeasts under proper conditions. The Protol Gesellschaft made use of the work of Neuberg and his co-workers and produced glycerine from sugar by fermentation with ordinary yeasts in a mash containing as high as 40% of its weight as sodium sulphite. The recovered yields of glycerine using beet sugar as the carbohydrate have been published and were about 10% of the weight of the sugar used. Acetaldehyde and carbon dioxide were by-products produced at the same time. Eoff, in this country, found that the production of glycerine was very largely increased by the addition of alkaline salts or alkalies such as sodium carbonate, sodium hydrate, potassium carbonate, potassium hydrate, etc., up to 5% of the weight of the mash, the sugar content of the mash being about 15%.

The production of glycerine by the addition of soda ash to a blackstrap molasses mash containing about 15% fermentable sugars require about 4% of the weight of the mash in the form of sodium carbonate in order to get the optium yields both of glycerine and alcohol. Experiments on a 45,000 gallon scale have been given, with these conditions, up to 25% of the fermentable sugars present in the mash as glycerine and up to 40% as alcohol. On this basis the soda ash requirements per pound of glycerine in the mash would be about 1.07 lbs., and with an 80% recovery, the soda ash requirements per pound of recovered glycerine would be 1.33 pounds. If soda ash costs 2 cents per pound, the cost for soda ash per pound of glycerine would be 2.66 cents. There would, of course, be additional charges for the handling of the soda ash which would bring the cost of the soda ash ready to put in the mash to approximately 3 cents per pound of recovered glycerine.

The blackstrap molasses which is used in these fermentations has an ash content of approximately 8% and of this about 75% is in the form of soluble potash salts. On the basis of 50,000 gallons of molasses per day there would be some 35,000 pounds of potash salts present.

These salts may be readily recovered from the fermented molasses mash. In such recovery, as preferably practiced, no precipitation of the gums or organic impurities is attempted but the thin mash is freed from alcohol by distillation and then concentrated to a relatively thick or viscous state. This mass may contain, for example, substantially 50 to 60% solids, 15 to 18% glycerine and the remainder water. The glycerine is best removed therefrom by rapid evaporation which may be effected satisfactorily by spreading the mass as a film on a heated surface or spraying it into a suitable drying atmosphere. There is left a dry glycerine free residue which can be very readily burned. The ash from the burning of this residue contains the potash salts and these can be recovered by solution in any well-known manner or the ash itself can be disposed of on the basis of its potash content for use in fertilizers or otherwise.

I have now discovered that in order to secure a good yield of glycerine by the fermentation of molasses, it is not necessary to add to the mash sufficient alkali-metal carbonate to impart a distinct alkalinity thereto, but that it is practicable to secure excellent yields of glycerine by adding to the mash a portion of the water soluble salts present in the above-mentioned ash obtained by burning the residue from the fermented mash which portion may be insufficient to render the mash alkaline. Instead of adding to the mash the separated water soluble salts obtained by leaching the ash, a part of the ash itself may be added, the insoluble components of the ash having no effect on the fermentation. The invention will be illustrated in detail by the following specific example.

A mash is made up of about 2300 g. of black strap molasses dissolved in 4900 g. water. To this mash, after sterilization, there is added, at a temperature of about 86° F., a yeast seed culture of 800 g. made up in the same proportion as the main mash. To both the mash and the seed is added about 0.5% of ammonium sulphate (based on the weight of the mash and seed) to furnish additional nitrogenous material for the yeast. After fermentation has become vigorous the first dose of the molasses salts either in solid form or in solution, or the molasses ash itself, is added to the mash. This addition of salts is equivalent to about 1% of the weight of the mash. Where molasses ash is used instead of the soluble salts in the molasses ash, an equivalent amount to bring the total soluble salts in the ash to 1% of the weight of the mash is added. Fermentation usually becomes less active immediately after the addition of the salts or ash, and may even in some cases apparently cease for a short period. It shortly becomes vigorous again, however, and after about one and one-half to two hours, depending on the exact conditions of the particular fermentation, a second addition of molasses salts or ash of the same weight is made. The same typical results are obtained as in the case of the first addition. When the fermentation again becomes vigorous a third dose of molasses salts or ash of light amount is added. When the fermentation has again become vigorous a fourth dose is added under the same conditions.

The fermenting mash is preferably kept at a temperature of 86 to 91° F. (30 to 33° C.), but may be varied between 73 to 100° F. (22 to 38° C.) if conditions of operation require it.

I have found in my experiments that the best yields of both glycerine and alcohol are produced when five equal doses of molasses salts or ash, in the proportions already described, are added to the mash under the conditions already described. The addition of five equal doses seems to give conditions for producing the optimum amounts of glycerine and alcohol from a practical viewpoint. I have found practically no difference in the yields of alcohol and glycerine in adding these salts or ash in solid form or in fairly saturated solution in water. In practical plant operation it would probably be cheaper to add the salts in saturated or nearly saturated salt solution, or in solution in a portion of the mash. The fermentation using these salts is apparently completed in less time than are those fermentations in which solid soda ash has been used. This is due partially to the fact that the molasses salts or ash additions may be made at much shorter time intervals than the soda ash additions, and apparently these salts or ash do not have as great an inhibiting effect on the speed of fermentation as the soda ash has. On this small scale the fermentations have been completed in about 72 hours with molasses salts or ash, whereas they have taken about 96 hours with the soda ash.

The species of yeast that I prefer to use is a species which has been arbitrarily designated No. 16, and which is described in detail in Patent 1,551,997, issued to F. A. McDermott September 1, 1925.

As sources of sugar, the various grades of molasses may be replaced by commercial cane and beet sugars, the commercial preparations of dextrose and invert sugar such as "cerelose", "hydral", "nulomoline", and confectioners' and refiners' syrups, or by sugar from raisins or other fruits, or by sugar from starch or starch-containing raw materials or from sawdust or other cellulose-containing materials which have been so hydrolized as to yield dextrose ar levulose. I do not limit myself to the specific proportions of salts given, or to the intervals indicated between the additions of the different portions of doses, or to the number of doses given above.

The molasses solution to be fermented may vary in Balling (or Brix) up to 30°, but about 25° is preferred. The solutions used with other sources of sugar vary in Balling (or Brix) in accordance with their content of fermentable sugar, which is preferably between 15 and 16% in the final mash. The weight of the salts used in the above example has been calculated on the basis of the weight of the entire mash, but is actually governed by the percentage of fermentable sugar and free acidity present in the mash as made up. As indicated above the proportion between the products of the fermentation may be controlled to a certain extent by varying the amount of added salts, and in my experimental work this has actually been varied between the limits of 3 and 20% of the weight of the molasses mash containing about 15.5% by weight of sugar.

To make clear the value of the new procedure, the results are tabulated below of a series of comparative fermentations made on an eight-kilogram scale under the following conditions:

Nos. 1 and 2—Regular soda ash doses.

Nos. 3 and 4—Same as 1 and 2 but the soda ash added in four equal doses.

Nos. 5 and 6—The salts recovered from a molasses fermentation were added in solid form in quantity such that the total water-soluble equalled the weight of the soda ash in 1 and 2. Added in five unequal doses.

Nos. 7 and 8—Same as 5 and 6 except that the solid salts were added in four equal doses.

Nos. 9 and 10—Same as 5 and 6 except that the water-soluble salts were added in saturated solution in amount equal to the weight of the soda ash as in 1 and 2 and in five unequal doses.

Nos. 11 and 12—Same as 5 and 6 except that the water-soluble salts were added in saturated solution in amount equal to the weight of the soda ash as in 1 and 2 and in four equal doses.

The results of these twelve tests are given below. The yields of glycerine and alcohol are given in percentages by weight of the actual yeast fermentable sugar instead of the total materials reducing Fehling solution. This method of calculating the yield results brings the experiments on a par with the work of other investigators who have used sugars as the fermentable material.

| Fermentation | % fermentable sugar converted to— | |
|---|---|---|
| | 100% alcohol | Glycerine |
| 1. Five unequal doses solid soda ash | 41.0 | 21.7 |
| 2. Same | 37.1 | 24.8 |
| 3. Four equal doses solid soda ash | 40.7 | 27.5 |
| 4. Same | 42.5 | 27.5 |
| 5. Five doses solid form sol. mol. salts | 40.8 | 25.7 |
| 6. Same | 40.1 | 25.4 |
| 7. Four doses solid form sol. mol. salts | 40.1 | 26.8 |
| 8. Same | 39.8 | 25.6 |
| 9. Five doses sat. sol. soluble mol. salts | 39.3 | 23.3 |
| 10. Same | 39.0 | 25.5 |
| 11. Four doses sat. sol. soluble mol. salts | 38.6 | 27.0 |
| 12. Same | 39.4 | 27.1 |

It is apparent from these results that the use of these recovered salts from molasses gives as good yields of alcohol and glycerine as does soda ash and that contrary to previous experiments using soda ash in saturated solution, the use of the solution of the soluble salts from molasses residues gives yields of alcohol and glycerine as high as those resulting from the use either of solid soda ash or solid salts from the molasses residues.

The composition of the ash of molasses varies to a certain extent but the soluble salts, which in this case are the useful part of the ash, do not vary as widely in their content as does the ash. Following are some typical analyses of the recovered ash.

| | 1 | 2 | 3 | 4 |
|---|---|---|---|---|
| Moisture | 1.58 | 1.66 | 1.26 | 0.60 |
| Insoluble | 37.71 | 40.14 | 45.83 | 47.16 |
| Soluble | 60.11 | 59.83 | 54.54 | 48.73 |
| | 99.40 | 101.63 | 101.63 | 96.49 |

Analyses of the soluble portion of the ash, based on (1) total ash (100%), and (2) on the total soluble matter (100%), are given below:

| | Total ash | | | | Total soluble | | | |
|---|---|---|---|---|---|---|---|---|
| | 1 | 2 | 3 | 4 | 1 | 2 | 3 | 4 |
| KCl | 21.83 | 20.93 | 20.70 | 19.78 | 36.32 | 34.98 | 37.97 | 40.58 |
| K$_2$SO$_4$ | 14.93 | 16.38 | 13.75 | 15.40 | 24.84 | 27.36 | 25.22 | 31.60 |
| K$_3$PO$_4$ | 0.15 | 0.17 | 0.06 | 0.04 | 0.25 | 0.28 | 0.11 | 0.09 |
| K$_2$CO$_3$ | 23.20 | 19.61 | 7.91 | 8.09 | 38.59 | 32.77 | 14.50 | 16.60 |
| KOH | | | 8.32 | 3.31 | | | 15.24 | 6.79 |
| Na$_2$CO$_3$ | | 2.74 | 3.80 | 2.11 | | 4.61 | 6.96 | 4.34 |
| | 60.11 | 59.83 | 54.54 | 48.73 | 100.00 | 100.00 | 100.00 | 100.00 |

The use of the recovered ash or the salts from the recovered ash from molasses fermentations is a new method of producing glycerine by fermentation and recognizes a fact which has not hithertofore been established, viz, that the production of glycerine is not a function solely of the OH or H ion concentration (i. e., the alkalinity or acidity) of the mash, but is probably a function as well of certain other ion concentrations.

The ash from beet sugar molasses or the recovered salts from these ashes also could be used in these fermentations. The savings involved by the use of these ashes or salts is considerable, amounting to 3 to 4 cents per pound of glycerine. The entire process is made much cheaper as a considerable quantity of heat can be realized from the combustion of the molasses residues and the surplus ash or salts from the burning of these residues can be utilized in the production of fertilizers or chemicals. Futhermore, the shortening of the fermentation period has the effect of greatly increasing the capacity of the plant.

The ash from the molasses residues can be recovered by any well known method such as by burning the residues under waste heat boilers, either in the dry form as produced in the two distillation methods in the copending patent applications above mentioned or by spraying concentrated solution of the molasses residue into a combustion chamber where, on igniting, the material will furnish its own heat to continue the combustion. The ash remaining from the combustion of the residue of molasses by either of these methods or by any other process can be utilized as such or its soluble salts can be dissolved and used in solution or the salts can be crystallized or separated from the water and used in the dry or wet form in the fermentation process.

Where the salts are added in five unequal doses (referred to, in other words, as the regular doses), the amount of successive doses increases from the first to the third and then decreases, as described in F. A. McDermott's patent. Where the total amount of salts to be added is 5% based on the weight of the mash, the percentage of the several doses may, for instance, be as follows:—first dose—0.75%; second—1.06%; third—1.40%; fourth—1.06%; fifth—0.75%.

I claim:

1. The process of producing alcohol and glycerol which comprises fermenting a molasses mash with a yeast, and adding, during said fermentation, a mixture of substantially the same composition as the incinerated ash of a fermented molasses mash.

2. The process of producing alcohol and glycerol which comprises fermenting a molasses mash with a yeast, and adding, during said fermentation, a mixture of substantially the same composition as the water soluble portion of the incinerated ash of a fermented molasses mash.

3. The process of producing alcohol and glycerol which comprises the step of fermenting a molasses mash with a yeast, and adding at intervals during the fermentation from four to six doses of a mixture comprising water-soluble potassium salts, said doses totalling from 3 to 7% of the weight of the mash, and said mixture being of substantially the same composition as the water soluble portion of the ash of a fermented molasses mash.

4. The process of producing alcohol and glycerol which comprises the step of fermenting a molasses mash with the hereinbefore described yeast No. 16, and adding at intervals during the fermentation from four to six doses of water-soluble potassium salts totalling from 3 to 7% of the weight of the mash, the major portion of each of said doses being potassium salts whose water solutions are practically neutral.

5. The process of producing alcohol and glycerol which comprises fermenting a molasses mash with a yeast, and adding at intervals during the fermentation several doses of a mixture containing water-soluble potassium salts, which salts are contained in and obtained from the incinerated ash of a yeast fermented molasses mash.

6. The process of producing alcohol and glycerol which comprises the step of fermenting a molasses mash with a yeast, and adding at intervals during the fermentation several doses of a mixture containing water-soluble potassium salts, which mixture is comprised in the water soluble portion of the ash of a yeast fermented molasses mash, the total of water-soluble potassium salts thus added amounting to from 3 to 7% of the weight of the mash undergoing fermentation.

7. The process of producing alcohol and glycerol which comprises the step of fermenting a molasses mash with a yeast, and adding at intervals during the fermentation from four to six doses of water-soluble potassium salts totalling about 5% of the weight of the mash, the major portion of each of said doses being potassium salts whose water solutions are practically neutral.

8. In a cyclic process of producing alcohol and glycerol the steps which comprise subjecting a blackstrap molasses mash to a yeast fermentation, recovering from the fermented mash the mixture of potassium salts contained therein, and adding at least a portion of said recovered potassium salts to another blackstrap molasses mash undergoing yeast fermentation, to promote the formation of glycerol therein.

9. The cyclic process of producing alcohol and glycerol which comprises subjecting a blackstrap molasses mash to a yeast fermentation, recovering from the fermented mash the mixture of potassium salts contained therein, and adding at least a portion of said recovered potassium salts in several doses to another blackstrap molasses mash to promote the formation of glycerol therein, each dose being added while the mash is at a stage of vigorous yeast fermentation.

10. The cyclic process of producing alcohol and glycerol which comprises subjecting a blackstrap molasses mash to a yeast fermentation, recovering from the fermented mash the mixture of potassium salts contained therein, and adding at least a portion of said recovered potassium salts, consisting chiefly of neutral potassium salts, to a second blackstrap molasses mash, said salts being added in several doses totalling from about 3 to 7% of the weight of said second mash, to promote the formation of glycerol therein, and fermenting the second mash by yeast.

11. The cyclic process of producing alcohol and glycerol which comprises subjecting a blackstrap molasses mash to a yeast fermentation, recovering from the fermented mash the mixture of potassium salts contained therein, and adding at least a portion of the recovered water-soluble potassium salts, consisting chiefly of neutral potassium salts, to a second blackstrap molasses mash containing about 15% of yeast fermentable sugar, said salts being added in several doses totalling from about 3 to 7% of the weight of the second mash, each dose being added while the second mash is at a stage of vigorous yeast fermentation.

12. The cyclic process of producing alcohol and glycerol which comprises subjecting a blackstrap molasses mash to a yeast fermentation, recovering from the fermented mash the mixture of potassium salts contained therein, and adding at least a portion of the recovered water-soluble potassium salts, consisting chiefly of neutral potassium salts, to a second blackstrap molasses mash containing about 15% of yeast fermentable sugar, said salts being added in from four to six doses totalling about 5% of the weight of the second mash, each dose being added while the second mash is at a stage of vigorous yeast fermentation.

13. In a process of producing alcohol and glycerol the steps which comprise fermenting a molasses mash with a yeast, and adding at intervals during the fermentation from four to six doses of the water-soluble salts contained in and obtained from the ash of a fermented molasses mash, said salts totalling from 3 to 7% of the weight of the mash to which they are added, the major portion of each of said doses being salts whose water solutions are practically neutral.

14. In the cyclic process of producing alcohol and glycerol which comprises subjecting molasses mash to a yeast fermentation and recovering from the fermented mash the mixture of salts contained therein, the step of adding at least a portion of said recovered salts substantially of the same composition as said mixture to another molasses mash undergoing yeast fermentation, to promote the formation of glycerol therein.

In testimony whereof I affix my signature.

JAMES W. LAWRIE.